March 3, 1953 — H. C. KLINGE — 2,630,231
TRACTOR ATTACHMENT
Filed Dec. 26, 1950 — 2 SHEETS—SHEET 1
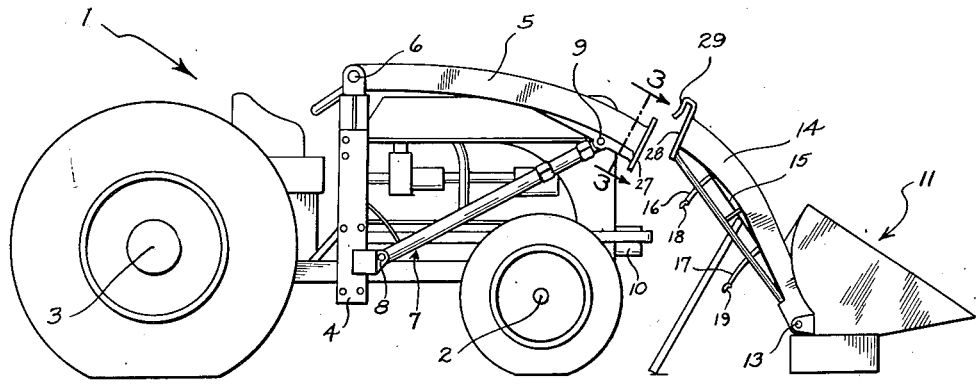
Fig. 1.
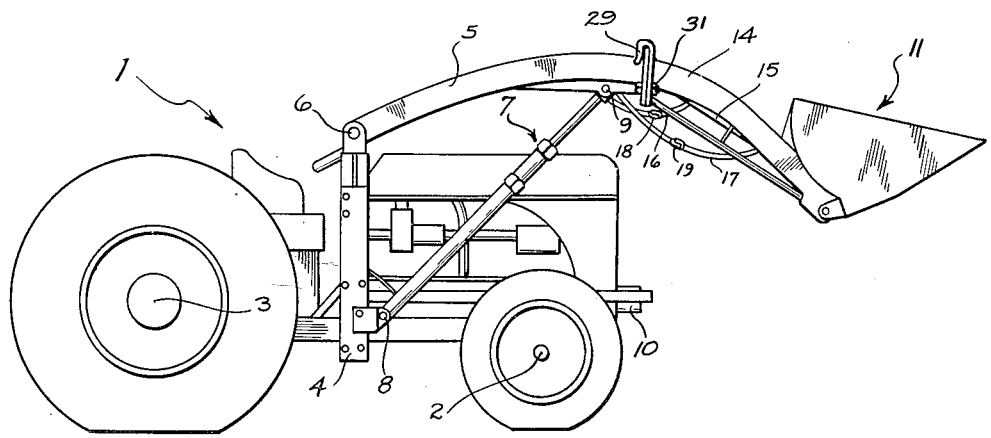
Fig. 2.
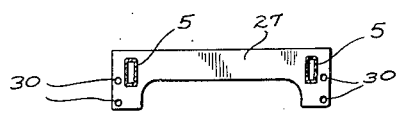
Fig. 3.
INVENTOR.
Hans C. Klinge
BY 
Atty.

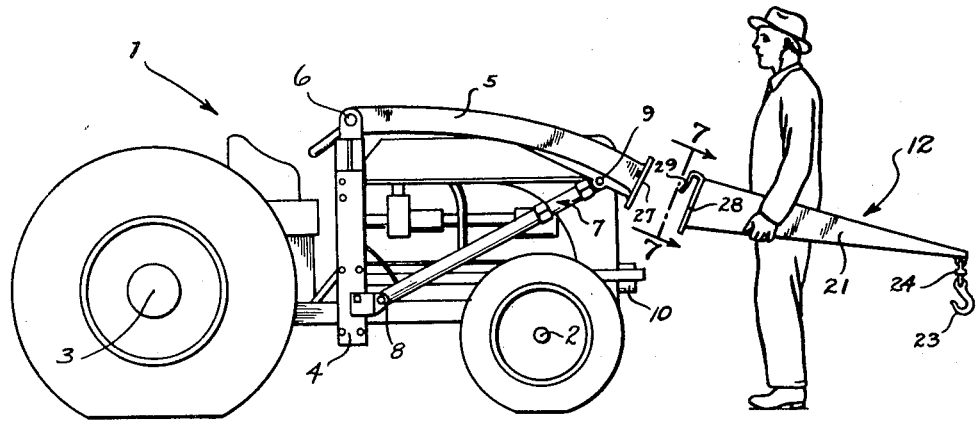
Fig. 4.
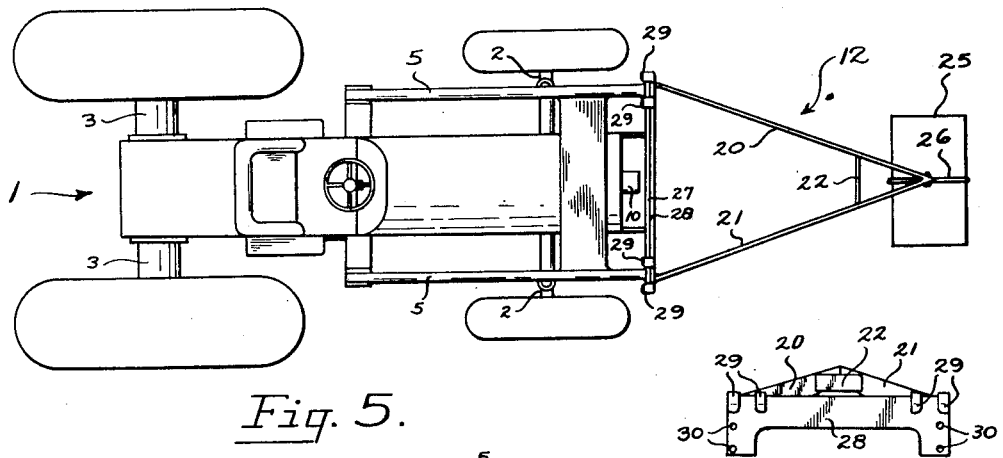
Fig. 5.
Fig. 7.
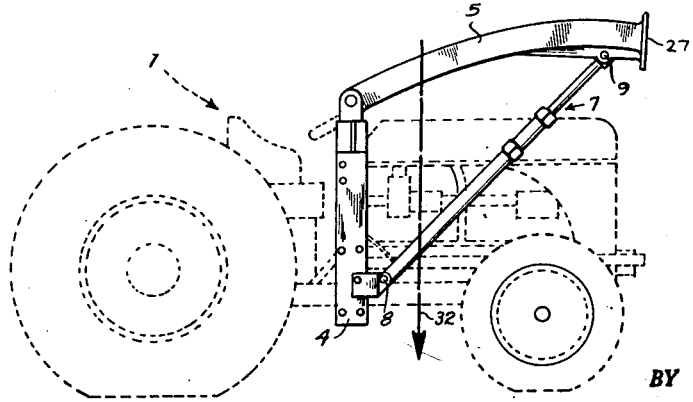
Fig. 6.
INVENTOR.
Hans C. Klinge Patented Mar. 3, 1953

2,630,231

UNITED STATES PATENT OFFICE 2,630,231

TRACTOR ATTACHMENT

Hans C. Klinge, Portland, Oreg.

Application December 26, 1950, Serial No. 202,729

3 Claims. (Cl. 214—140)

This invention relates to an attachment for interchangeably securing a scoop, A-frame or the like to a tractor or for allowing the unhampered use of the tractor in operation when none of these devices are secured thereto.

One object of my invention is to provide a tractor attachment lying within the peripheral outline of the tractor and having the center of mass thereof longitudinally intermediate the tractor axles all to the end of promoting traction on the wheels and providing a balanced, easy handling, structure.

There have recently come upon the market a variety of attachments for farm-type tractors mechanically to aid the farmer in the performance of diversified lifting, shoveling, gathering, and sweeping operations. The type attachment with which I am concerned carries a working or operating tool such as a scoop or the like upon the free ends of a pair of pivotably mounted booms which extend forwardly and downwardly over the engine hood. For example, one such attachment, now conventional in the art, carries a hydraulically-actuated scoop which is adapted to dig, lift, and dump or to scrape and pile. When the farmer wishes to break and load dirt or scoop and load manure, he manipulates the boom arms and tractor in the manner of a large shovel. Similarly, the scoop per se may be interchangeable with a hay rake or fork to handle hay from a windrow to a stack or with a dozer blade to scrape snow or clean ditches.

From practical experience and inventive experimentation with these conventional tractor attachments, I have come to appreciate certain disadvantages which are inherent therein. The first such disadvantage stems from the inherent front heavy disposition of mass produced by the cantilever mounting of the boom and tool structure. Thus, of necessity, the booms cantilever from the medial or forward portion of the tractor chassis out over the engine hood to a point where the scoop or lift can make contact with the ground. While the operating tool is being worked, the tipping tendency caused by this front heavy disposition may not be critical since the rear power wheels of the tractor are not called upon to furnish a great deal of driving traction. When, however, the operating tool is idle and the tractor is connected to a gang plow, mower, or the like, this tipping tendency becomes of critical importance since the rear wheels must, while pulling, have efficient traction.

I am aware that one obvious method of promoting traction includes the disassembly and removal of the attachment whenever a farming tool is to be pulled. However, the structure strength requirements of the conventional attachment require a semi-permanent type mounting on the tractor chassis. Such a mounting makes disassembly a time-consuming, intricate operation, which, I feel, should be avoided wherever possible. Accordingly, one object of my invention is to provide a tractor attachment which lies within the peripheral outline of the tractor rather than protruding outwardly and in front thereof whereby traction is promoted rather than inhibited. For this reason, my attachment need not be disassembled and removed from the tractor chassis when other farming tools are to be worked or pulled. This saves time when the farmer or operator wishes to change from one type of operation to another.

Another object of my invention is to provide a ready attachment and detachment mechanism for interchangeably securing a variety of operating tools to the boom arms of a tractor attachment. Within the scope of my inventive concept, this mechanism best takes the form of a pair of complementary abutment plates which are secured together by a plurality of open-mouthed hook elements. These hook elements and plates are of critical importance since they transfer the stress forces across the attachment mechanism in an efficient manner yet require no intricate latches, locking nuts, or the like, these latter securing devices being considered an obvious, time-consuming, disadvantage.

These and other objects and advantages of my invention will be set forth in the following detailed description taken in conjunction with the accompanying drawings, wherein:

Fig. 1 is a side view of a wheeled tractor carrying my attachment and showing a scoop or shovel-type operating tool in position and ready to be secured thereto;

Fig. 2 is a side view similar to Fig. 1 but showing the scoop or shovel-type operating tool fully mounted and in a raised position;

Fig. 3 is a section view, taken substantially on the line 3—3 of Fig. 1, showing the elongated face plate which joins the ends of the two boom arms for securing an operating tool thereto;

Fig. 4 is a side view similar to Fig. 1, but showing an operator about to secure an A-frame type operating tool to my tractor attachment;

Fig. 5 is a plan view with the operating tool of Fig. 4 mounted upon the attachment and showing the manner in which the entire attachment lies within the peripheral outline of the tractor to promote traction;

Fig. 6 is a side view showing the attachment in full lines and the tractor in dashed outline thereby to indicate the manner in which the center of mass of the attachment is located longitudinally intermediate the tractor axles to promote traction; and Fig. 7 is a detailed view of the A-frame type operating tool looking in the direction of the arrowed section line 7—7 of Fig. 4.

The attachment of my invention is adapted for use with a conventional wheeled tractor 1 having front and rear axles 2 and 3, respectively. To this end, an upstanding mounting member 4 is secured to each side of the tractor 1 intermediate the axles 2 and 3. The upper end of each mounting member 4 pivotally carries one end of a boom arm 5 as indicated at the pivot point 6. The pivot points 6 laterally are disposed opposite one another to define a lateral or transverse axis about which the boom arms 5 swing in unison.

Movement is imparted to the boom arms 5 by means of a pair of similar hydraulic power units generally indicated at 7. Each power unit is secured, at the lower end 8, to a corresponding mounting member 4 and, at the upper end 9, to a corresponding boom arm 5. The upper end point of joinder 9 is made adjacent the terminal end of each boom 5 to provide a maximum leverage thereupon when the power unit is actuated. The specific details of the hydraulic units are without the scope of my inventive concept. Suffice to say, however, each power unit 7 includes a piston-and-cylinder mechanism which is actuated by a hydraulic pressure fluid supplied by a common hydraulic pump 10 driven from the tractor engine. When the pump 10 supplies pressure fluid to the lower end of the power units, the boom arms 5 are pivoted about their common transverse axis (defined by the pivot points 6) from the position of Fig. 1 to the position of Fig. 2. The supply of fluid to the upper end of the units reverses the movement. As will be understood by one familiar with these devices, the position of Fig. 2 does not define a full extension of the hydraulic power unit 7 but rather an intermediate stage, since the unit is capable of swinging the boom arms to a substantially vertical position.

Referring now to the operating tools which may be carried by my tractor attachment, I have shown, by way of example, a scoop or shovel 11 (in Figs. 1 and 2) and an A-frame 12 (in Figs. 4, 5, and 7). The scoop 11 is pivotally carried, as at 13, by two arms 14 which constitute longitudinal extensions of the boom arms 5. Pivotal movement of the scoop 11 is provided by a hydraulic motor 15 which is secured, at one end, to the scoop and, at the other end, to a cross frame member carried by the arms 14. Conventionally, this hydraulic motor 15 is actuated by fluid pressure supplied thereto from the hydraulic pump 10 through pressure lines 16 and 17 carrying couplings 18 and 19, respectively. This pivot mechanism is without the scope of my invention. However, it allows the scoop 11 to be maintained level while the boom arms 5 are pivoted up into the air and to be dumped when the arms 5 are in proper position.

With regard to the A-frame 12, two elongated truss members 20 and 21 are braced by a cross frame member 22 (see Fig. 5). The truss members 20 and 21 are joined at their forward end to carry a hook 23 suspended from a swivel 24.

With this mechanism the farmer or operator may perform many diversified lifting operations. For example, I have shown (see Fig. 5) the manner in which a barrel 25 may be lifted when it is secured to the hook 23 by means of a cable 26.

As previously mentioned, I have provided a ready attachment and detachment mechanism interchangeably for securing the various operating tools to the boom arm 5. This mechanism includes an elongated lateral face plate 27 (see Fig. 3) which joins the ends of the boom arms 5. A similar elongated butt plate 28 joins the A-frame truss members 20 and 21 or the scoop arms 14. When other operating tools are employed, I utilize a similar butt plate thereon. Either the face plate 27 or the butt plate 28 carries one or more hook-like fastening devices for encircling and engaging the upper edge of the plate complementary thereto. To this end, I have shown a plurality of open-mouthed hook elements 29 secured to the top of the butt plate 28 (see Fig. 7). When the plates 27 and 28 are brought together in face-to-face relationship, the hook elements 29 encircle and engage the upper edge of the face plate 27. Such engagement provides a ready attachment mechanism capable of taking the stress and strain imposed thereon when an operating tool is worked. While I have determined that these hook elements 29 are sufficient to take the stress and strain, it may be desirable to provide other minor fastening elements to prevent inadvertent detachment of the operating tool from the boom arms 5. To this end, I have shown a plurality of bolt holes 30 piercing the face plate 27 and butt plate 28 at complementary points spaced from the upper edges thereof. These bolt holes may accommodate nut and bolt elements 31 if desired (see Fig. 2).

I have previously mentioned that one of the objects of my invention is to provide a tractor attachment lying within the peripheral outline of the tractor and having the center of mass thereof longitudinally intermediate the tractor axles. All of this is directed to the end of promoting traction on the wheels and providing a balanced, easy-handling, structure. The structure serving these objects is best illustrated in Figs. 5 and 6. Thus, Fig. 5 indicates the manner in which the hydraulic power units 7, boom arms 5, mounting members 4, and face plate 27 all lie within the peripheral outline of the tractor. Furthermore, I have shown an arrow 32 in Fig. 6 to indicate the center of mass of the above described attachment mechanism. It will be seen that this arrow 32 is disposed longitudinally intermediate the tractor axles 2 and 3. Thus, when the tractor is worked to pull a gang plow, mower, or the like, the operating tool may be removed from the ends of the boom arms 5 and the tractor attachment will exert no tipping tendency such as would be present with the conventional tractor attachment. Further, since the center of the mass of the tractor attachment is located intermediate the axles 2 and 3, this mass promotes rather than inhibits traction upon the tractor wheels. I deem these features to be of critical importance since the tractor wheels must have efficient traction while pulling.

The operative sequence involved in securing an operating tool to my tractor attachment is best illustrated with reference to Figs. 4 and 5. As therein shown, the farmer or operator first retracts the hydraulic power units 7 to lower the boom arms 5 to their lowermost position. Thereafter, he steps between the truss members 20 and 21 and lifts the A-frame into the position shown in Fig. 4. The face plate 27 and butt plate 28 are then brought into face-to-face engagement with the hook elements 29 encircling and engaging the upper edge of the face plate. If desired, the operator may then secure the nuts and bolts 31 through the bolt holes as a safety measure. The barrel 25, by way of example, may be lifted by engaging the hook 23 through a cable 26 wrapped about the periphery of the barrel. Thereafter, the tractor engine is started in order to actuate the hydraulic pump 19 and supply fluid pressure to the hydraulic power units 7. By the manipulation of suitable controls, the power units 7 are extended to pivot the boom arms 5 about the common transverse axis defined by the pivot points 6 and the barrel 25 is lifted free of the ground. If the barrel 25 is to be loaded into a wagon or truck, the tractor may be driven to a point adjacent thereto and the boom arms 5 lowered. While this step-by-step operative sequence is illustrative of the manner in which my tractor attachment may be employed, I do not mean thereby to limit the scope of my inventive concept since other operating tools may be interchanged with the A-frame 12 or the scoop 11. Such interchange is enhanced by my novel hook and plate securing mechanism.

In conclusion, I have served the objects of my invention by promoting the utility of the conventional wheeled tractor. This has been done by allowing for the ready interchange of various operating tools and by allowing the tractor to be worked in other pulling operations without diminishing traction and without incurring any tendency to tip.

I claim:

1. An attachment for use with a wheeled tractor having a front and a rear axle, comprising a mounting member secured to each side of the tractor intermediate said axles, each said mounting member pivotally carrying one end of a boom arm, an elongated plane face plate joining the other ends of said arms to maintain the same in parallel relationship, said plane face plate, boom arms, and mounting members all lying within the peripheral outline of said tractor to promote traction when the tractor is worked, an operating tool having an elongated plane faced butt plate complementary to said plane face plate, and means for detachably securing said plates together in face-to-face, plane-to-plane relationship.

2. An attachment for use with a wheeled tractor having a front and a rear axle, comprising an upstanding mounting member secured to each side of the tractor intermediate said axles, the upper end of each said mounting member pivotally carrying one end of a boom arm, the other ends of said boom arms being swingable about a common transverse axis, power means for pivoting said boom about said common axis, an elongated plane face plate laterally joining the other ends of said arms and defining a plane abutment area of substantial size, an operating tool having an elongated plane faced butt plate complementary to said face plate and carrying a pair of arms constituting longitudinal extensions of said boom arms, and means for detachably securing said plates together in face-to-face, plane-to-plane relationship, said latter means including a plurality of open-mouthed hook elements carried by the upper margin of said butt plate for encircling and engaging the upper edge of said face plate.

3. An attachment for use with a tractor, comprising an upstanding mounting member secured to each side of the tractor, the upper end of each said mounting member pivotally carrying one end of a boom arm, power means joined to said arms adjacent the other ends thereof for pivoting the same, an elongated face plate laterally joining the other ends of said arms and defining an abutment area of substantial size, said face plate, power means, boom arms, and mounting members all lying within the peripheral outline of said tractor, an operating tool having an elongated butt plate complementary to said face plate, means for detachably securing said plates together in face-to-face relationship, said latter means including a longitudinally extending hook element carried by the upper margin of said butt plate and having a vertical finger all for encircling and engaging the upper edge of said face plate, said vertical finger being spaced from said butt plate the thickness of said face plate, and fastening elements including bolts securing said plates together at points spaced from the upper edge of said face plate.

HANS C. KLINGE.

REFERENCES CITED

The following references are of record in the file of this patent:

UNITED STATES PATENTS

| Number | Name | Date |
|---|---|---|
| 2,281,928 | Fletcher | May 5, 1942 |
| 2,322,432 | Forte | June 22, 1943 |
| 2,387,656 | Gledhill | Oct. 23, 1945 |
| 2,455,474 | Drott et al. | Dec. 7, 1948 |
| 2,495,143 | Simmonds | Jan. 17, 1950 |
| 2,526,500 | Pilch | Oct. 17, 1950 |